United States Patent [19]

Shimada

[11] Patent Number: 4,854,997
[45] Date of Patent: Aug. 8, 1989

[54] METHOD OF MANUFACTURING AUTOMOTIVE SEAT

[75] Inventor: Makoto Shimada, Akishima, Japan

[73] Assignee: Tachi-S Co., Ltd., Tokyo, Japan

[21] Appl. No.: 125,455

[22] Filed: Nov. 25, 1987

[51] Int. Cl.[4] .................... B32B 3/30; B32B 3/00
[52] U.S. Cl. .................... 156/245; 156/212; 156/214; 156/293; 264/321; 425/DIG. 29; 297/DIG. 1
[58] Field of Search .......... 264/321; 156/293, 245, 156/212, 214, 232, 475, 211, 257, 268, 492, 443; 425/DIG. 29, 457; 297/DIG. 1

[56] References Cited

U.S. PATENT DOCUMENTS

| | | | |
|---|---|---|---|
| 3,262,136 | 7/1966 | Sevcik | 156/257 X |
| 4,160,052 | 7/1979 | Krysiak et al. | 156/257 X |
| 4,416,027 | 11/1983 | Perla | 156/304.5 X |
| 4,496,412 | 1/1985 | Ritter | 156/304.5 X |
| 4,722,760 | 2/1988 | Shimada | 156/212 X |

Primary Examiner—Michael W. Ball
Assistant Examiner—Jeff H. Aftergut
Attorney, Agent, or Firm—Browdy & Neimark

[57] ABSTRACT

A method of manufacturing an automotive seat in which a cushion body having a deep groove formed therein is bent at the groove so that the groove is divergently opened, and a covering member is pressed and bonded to the cushion body with a part of the covering member being inserted into the opened groove whereby a decorative groove is formed in the surface of the seat during the seat assembling process.

7 Claims, 2 Drawing Sheets

METHOD OF MANUFACTURING AUTOMOTIVE SEAT

BACKGROUND OF THE INVENTION

1. Field of the Invention

The present invention relates to a method of manufacturing an automotive seat, and in particular relates to a method of manufacturing such an automotive seat that has a deep decorative groove formed therein for aesthetically improving purpose.

2. Description of the Prior Art

Of many ways for producing automotive seats, there has been generally practiced a method in which a foamable material (such as urethane foam) is subjected to a foaming process by use of a mold so as to form a cushion body of a predetermined contour of seat, and then, a covering member is bonded to the cushion body. In this method, an alternative one exists, including the step of firstly placing the covering member within the mold and secondly effecting the foaming process together with the covering member, to thereby produce a seat.

In general, the former method has been adopted in preference to the latter one, because the latter involves the problem that the covering member, when bonded to an inferior cushion body that has not been foamed uniformly, can never be removed therefrom for a re-utilization purpose, which results in a redundant production of inferior seats.

Now, what we, the inventor, highlight in this connection, is the creation of a deep decorative groove in the above-mentioned covering member, with a view to enhancing the aesthetic appearance of seat.

As described above, the former seat manufacturing method includes the steps of bonding the covering member to the preformed cushion body by way of adhesive application to the surfaces of the cushion body ansd subsequent pressing process for pressing the covering member against the adhesive-coated cushion body, so that the covering member is in a close contact with the uenven surfaces of the cushion body. For this reason, the drawback is found in that the decorative groove to be formed in the surface of the seat is limited in width and depth due to such pressurized bonding process, and as a result, a deep decorative groove can not be formed in the seat.

SUMMARY OF THE INVENTION

In view of the above-mentioned drawbacks, it is a primary purpose of the present invention to provide an improved method of manufacturing an automotive seat which permits creation of a deep decorative groove in the surface of the seat, on the basis of the above-mentioned method which involves bonding a covering member to a mold preformed cushion body using an adhesive.

In accomplishing the above purpose, the present invention comprises the steps of:

(a) forming a groove in the upper surface of a foam cushion body;

(b) causing the groove to open divergently and applying an adhesive to the groove as well as the upper surface of the cushion body;

(c) inserting a part of a covering member into the divergently opened groove;

(d) then, causing such opened groove to close and at the same time, pressing and bonding the covering member to the upper surface of the cushion body, whereby a deep decorative groove is formed in the upper surface of the seat. As one of the notable aspects of the present invention, the above-described divergently opening of the groove is effected by bending the cushion body at the groove. Therefore, since such divergently opened groove allows the ease in inserting a part of the covering member thereinto, it is readily possible to form the groove in any required width and depth, and thus a deep decorative groove can be formed in the surface of the seat.

It is another purpose of the present invention to provide an improved method of manufacturing an automotive seat having a deep decorative groove in an easy manner.

To this end, in accordance with the present invention, there are provided an upper die having means for causing the opening and closing of the groove formed in a cushion body, and a lower die having inserting means for inserting a part of a covering member into the groove of the cushion body. Accordingly, the cushion body is at its bottom secured to the groove opening/closing means of the upper die, while the covering member is turned inside out and placed on the lower die, then, the groove of the cushion body is divergently opened by operation of the groove opening/closing means, thereafter, while lowering the upper die towards the lower die, the part of the covering member is inserted into the opened groove with the aid of the inserting means, and after closing the opened groove through the groove opening/closing means, the upper die is pressed against the lower die, whereupon a deep decorative groove is formed in an easy manner and at the same time the covering member is bonded to the cushion body.

DETAILED DESCRIPTION OF PREFERRED EMBODIMENTS OF THE INVENTION

Figure 1:
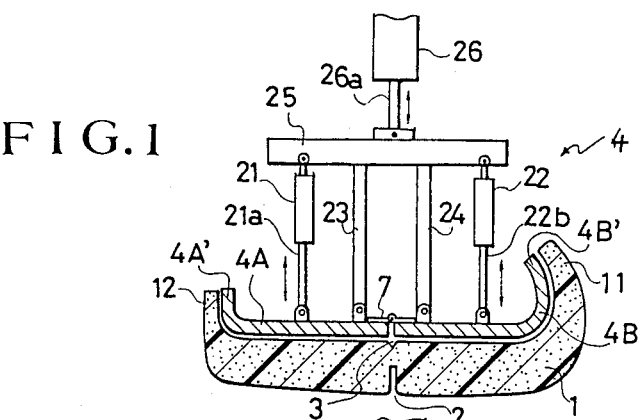
FIG. 1 is a longitudinal sectional view showing the state in which a cushion body is secured to an upper die in accordance with the present invention.

Referring to FIG. 1, reference numeral (1) denotes a foam cushion body which is foamed in a denotes a foam cushion body which is foamed in a mold into a predetermined configuration of seat, and has a deep groove (2) formed in its upper surface and a notch (3) formed in its bottom surface. The cushion body (1) is preferably made of urethane foam, and further so formed that its peripheral portion is raised relative to its central seating portion, thereby providing an uneven surface in the cushion body per se (as understandable from FIG. 5)

and that an inwardly curved end portion (11) is formed at one end portion thereof and a substantially vertically bent portion (12) is formed at the other opposite end portion.

The notch (3) serves to facilitate the ease of bending the cushion body (1) thereaound, and care should be taken to ensure that the width and depth of the notch (3) are of smallest required degree sufficient to attain such function, so as to avoid any adverse affection on the cushioning effect and strength of the cushion body (1) in the vicinity of the groove (2).

The illustrated groove (2) is formed transversely of the cushion body (1), but may be formed in any desired portion of the cushion body (1) in any desired direction.

Designation (4) represents an upper die adapted to secure the foam cushion body (1) threreon. The upper die (4) essentially consists of two separate segments (4A)(4B) which are rotatably connected with each other by means of a hinge (7), and the segments (4A)(4B) are respectively provided with hydraulic cylinders (21)(22) for their respective rotational movements. Specifically, the hydraulic cylinders are at their upper portions fixed to a support base plate (25) and at their lower portions pivotally connected to the respective segments (4A)(4B) by means of rods (21a)(22b). With this construction, operating the hydraulic cylinders (21)(22) to retract the rods (21a)(22b) causes the two segments (4A)(4B) to rotate upwardly around the hinge (7) serving as the center of rotation, whereupon the upper die (4) takes on a V-shaped configuration, as seen in FIG. 2, and operating the cylinders (21)(22) reversely to extend the rods (21a)(22b) causes the segments (4A)(4B) to rotate downwardly around the hinge (7), in which case, the upper die (4) is in a horizontally extended state, as in FIG. 1.

The segment (4A) is at its outer end portion integrally formed with a substantially vertical portion (4A') while the other segment (4B) is also at its outer end portion integrally formed with an upwardly curved portion (4B'), in such a manner that the vertical portion (4A') and upwardly curved portion (4B') respectively conform to the inner surfaces of the inwardly curved end portion (11) and vertically bent protion (12) of the cushion body (1).

Figure 2:
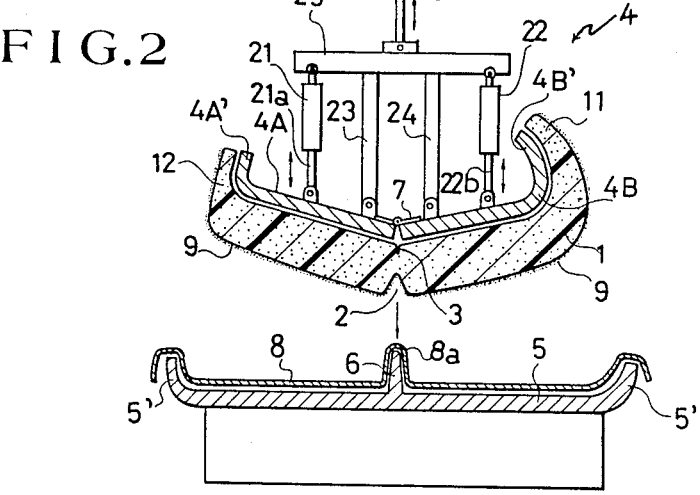
FIG. 2 is a longitudinal sectional view which shows the process in which the cushion body is bonded to a covering member.

Referring to FIG. 2, designation (5) represents a lower die having a shaping surface which conforms to the contour of the upper surface of the cushion body (1), with an inserting means (6) provided therein. In the illustrated embodiment, the inserting means (6) comprise a projection integrally formed in the shaping surface of the lower die (5), which procjection is of a length substantially equal to that of the groove (2) and of a height substantially equal to the depth of the groove (20). The lower die (5) is at its both end portion formed with upwardly porjected portions (5').

As shown in FIGS. 1 and 2, there are provided a pair of support rods (23)(24) between the two segments (4A)(4B) and the support base plate (25), such that the support rods (23)(24) are at their lower end portions pivotally connected to the segments (4A)(4B), respectively, and at their upper end portions fixed to the base plate (25), in a manner allowing the above-described rotational movements of the segments (4A)(4B). The support bas plate (25) is further at its upper surface connected to another single hydraulic cylinder (26) via a rod (26a), and as such, the operation of the cylinder (26) permits vertical movements of the upper die (4) towards and away from the lower die (5).

The covering member (8) is made of a woven fabric of natural fibers or synthetic fibers, or made of a synthetic resin film (for example, vinyl chloride). Reference character (8a) denotes a portion of the covering member (8) which covers the projection forming the inserting means (6) of the lower die (5), and it is to be inserted into the groove (2) of the cushion body (1).

Now, a description will be made in regard to the method of the present invention, using the above-described elements.

At first, the cushion body (1) is secured to the segments (4A)(4B) of the upper die (4). In this regard, it is seen that the inwardly curved end portion (11) and vertically bent portion (12) of the cushion body (10) resiliently embrace the segments (4A)(4B), respectively, whereby the cushion body (1) is assuredly secured to the upper die (4) without using a special securing member. (See FIG. 1)

Then, the hydraulic cylinders (21)(22) are operated to cause the segments (4A)(4B) to rotate upwardly, taking on a substantially V-shaped configuration, so that the cushion body (1) is bent symmetrically in relation to the groove (2) and notch (3) into a likewise V-shaped configuration, and that the groove (2) is thereby opened divergently, as shown in FIG. 2.

In this state, an adhesive (9) is applied to the opened groove (2) as well as to the surface of the cushion body (1).

The single hydraulic cylinder (26) is operated to lower those V-shape bent upper die (4) and cushion body (1) towards the lower die (5) so that the groove (2) thus opened receives the projection (6) together with the portion (8a) of the covering member (8).

Thereafter, the cylinders (21)(22) are operated in order that the segments (4A)(4B) are rotated downwardly and positioned flush with each other in a horizonatal line, as shown in FIG. 1, as a result of which, the groove (2) is closed, holding the portion (8a) of the covering member (8) therebetween.

Next, the single cylinder (26) is further operated to lower the upper die (4) toward the lower die (5) so as to press the adhesive-coated surface of the cushion body (1) against the covering member (5). By being so pressed, the covering member (5) is integrally bonded to the cushion body (1).

After the bonding process, the single cylinder (26) is operated so as to raise the upper die (4) from the lower die (5).

Figure 4:
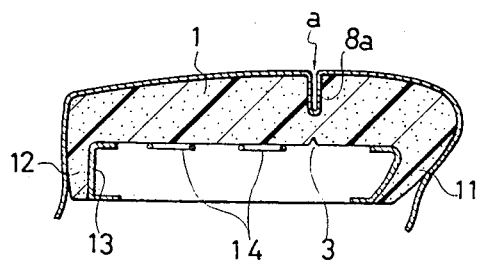
FIG. 4 is a longitudinally sectional view of resultant seat manufactured by the present invention method.

Thus-bonded cushion member is then removed from the upper die (4), whereupon obtained is such resultant cushion (1) with the deep decorative groove (a) formed therein, as shown in FIG. 4.

Figure 3:
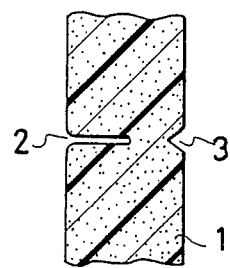
FIG. 3(A) is a partially enlarged sectional view shwoing the closed state of the groove formed in the cushion body.
FIG. 3(B) is a partially enlarged sectional view showing the opened state of the groove formed in the cushion body, with the cushion body being bent at the groove.
Figure 3:
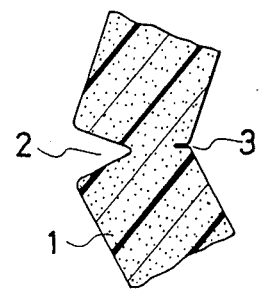

FIG. 3 (A) illustrates the state in which the groove (2) of the cushion body (1) is closed.

FIG. 3 (B) illustrates the state in which the groove (2) is opened divergently, with the cushion body (1) being bent at the groove (2) and notch (3) into a V-shaped configuration.

FIG. 4 shows a resultant seat in which the above-described cushion body (1) with the covering member (8) integrally bonded thereto is attached to a frame of ⊐ shaped configuration in section (13), and springs (14) are extended in the frame (13).

Figure 5:
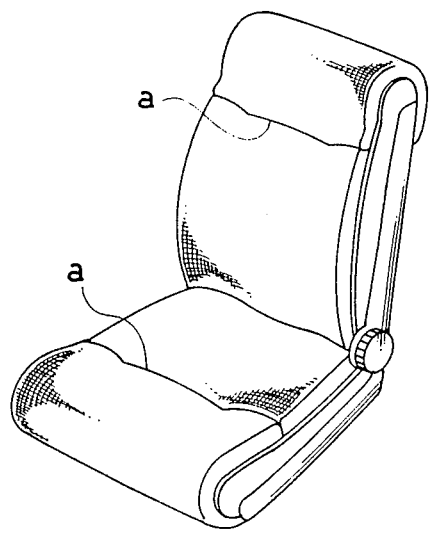
FIG. 5 is a perspective view of a resultant seat manufactured in accordance with the present invention method.

FIG. 5 shows an automotive seat manufactured in accordance with the above-described method of the present invention, in which deep decorative grooves (a) are formed.

As regards the lower die (5), in the present embodiment, it is fixed in an unmoved manner, but may be provided with a cylinder to enable the vertical movement of the lower die (5). In such case, the aforementioned single cylinder (26) is not needed.

While in the illustrated embodiment the adhesive (9) is applied to the cushion body (1), it may be arranged that the adhesive (9) is applied to the covering member (8), even in which case, the same effects as stated above are obtained.

Further, the cushion body (1) is the one formed in a mold, but a slab member may be used in the formation thereof.

From the above description, it will be appreciated that, in accordance with the present invention, a deep groove is preformed in a cushion body, and by bending the cushion body, the groove is opened divergently, then a covering member is inserted part-way into the opened groove, after which the groove is closed, and the covering member is pressed and bonded to the cushion body, and accordingly it is readily possible to form a deep groove in any required width and depth. Therefore, even when the groove is too small in width, it can be neatly formed with the corresponding part of the covering member bonded thereto.

The description above has just been given of preferred embodiments of the present invention, but it should be understood that the invention is not limited to the embodiments illustrated, but various other replacements, modifications and additions may structurally be possible without departing from the scope and spirit of the appended claims for the invention.

What is claimed is:

1. A method of manufacturing an automotive seat, comprising the steps of:
   forming a foam cushion body with a groove in an upper surface thereof by way of foaming in a mold;
   securing a bottom surface of said foam cushion body to an upper die which is provided with a bending means for bending the foam cushion body rearwardly;
   opening said groove by bending said foam cushion body rearwardly;
   applying an adhesive to said opened groove as well as said upper surface of said cushion body;
   turning inside out a covering member and placing it upon a lower die;
   thereafter, lowering said upper die towards said lower die;
   inserting a part of said covering member into said groove of said cushion body by virtue of inserting means provided on said lower die, said inserting means being so adapted that it is to be inserted into said groove together with said part of said covering member;
   then, lowering further said upper die to press and bond said cushion body to said covering member, thereby bonding said covering member to said upper surface of said cushion body while retaining said groove; and
   raising the upper die from the lower die.

2. The method as defined in claim 1, wherein said bending means of said upper die comprise two separate segments which are rotatably connected with each other by means of a hinge and wherein each of said segments is operatively connected with a hydraulic cylinder.

3. The method as defined in claim 1, wherein said cushion body is made of a urethane foam and foamed in a mold into a predetermined outer shape of seat having a groove formed in the upper surface thereof.

4. The method as defined in claim 1, wherein said cushion body has a downwardly extending portion integrally formed in a lower peripheral portion thereof so that said cushion body resiliently embrace said upper die.

5. The method as defined in claim 1, wherein said cushion body is at a lower surface thereof formed with a notch which serves to facilitate the ease in opening said groove formed in the upper surface of said cushion body.

6. The method as defined in claim 1, wherein said inserting means comprise a projection having a length substantially equal to that of said groove and a height substantially equal to an depth of said groove.

7. The method as defined in claim 1, wherein said lower die is so formed as to conform to an uneven upper surface of said cushion body.

* * * * *